US007669781B2

(12) United States Patent
Sternberger et al.

(10) Patent No.: US 7,669,781 B2
(45) Date of Patent: Mar. 2, 2010

(54) DRINKING STRAW COMPRISING A REINFORCED SECTION

(75) Inventors: Elke Sternberger, Wuerselen (DE); Johannes Bartholomaeus, Aachen (DE); Dieter Schateikis, Stolberg (DE)

(73) Assignee: Gruenenthal GmbH, Aachen (DE)

( * ) Notice: Subject to any disclaimer, the term of this patent is extended or adjusted under 35 U.S.C. 154(b) by 167 days.

(21) Appl. No.: 11/829,573

(22) Filed: Jul. 27, 2007

(65) Prior Publication Data

US 2008/0011869 A1 Jan. 17, 2008

Related U.S. Application Data

(63) Continuation of application No. PCT/EP2006/050471, filed on Jan. 26, 2006.

(30) Foreign Application Priority Data

Jan. 28, 2005 (DE) ....................... 10 2005 004 256

(51) Int. Cl.

*A47G 21/18* (2006.01)
*A61J 15/00* (2006.01)
*F16L 9/133* (2006.01)

(52) U.S. Cl. .......................... 239/33; 239/590; 138/109

(58) Field of Classification Search .................. 239/12, 239/24, 33, 462, 575, 590, 601; 138/109, 138/153, 178; 215/388; 424/400
See application file for complete search history.

(56) References Cited

U.S. PATENT DOCUMENTS

| | | | | | |
|---|---|---|---|---|---|
| 1,813,285 | A | * | 7/1931 | Galetschky | 239/33 |
| 3,109,590 | A | * | 11/1963 | Graham | 239/33 |
| 2005/0145287 | A1 | * | 7/2005 | Ottolini et al. | 138/109 |

* cited by examiner

*Primary Examiner*—Darren W Gorman
(74) *Attorney, Agent, or Firm*—Crowell & Moring LLP

(57) ABSTRACT

A drinking straw with a wall having a first and a second end, wherein the drinking straw comprises a reinforced section at its first and/or second end. A method for producing a drinking straw is also provided.

6 Claims, 1 Drawing Sheet

DRINKING STRAW COMPRISING A REINFORCED SECTION

CROSS REFERENCE TO RELATED APPLICATIONS

This application is a continuation of International Patent Application No. PCT/EP2006/050471, filed Jan. 26, 2006, designating the United States of America, and published in German as WO 2006/079648 A1, the entire disclosure of which is incorporated herein by reference. Priority is claimed based on German Patent Application No. 10 2005 004 256.2 filed Jan. 28, 2005.

FIELD OF THE INVENTION

In certain embodiments, the present invention relates to a drinking straw with a wall having a first and a second end, wherein the drinking straw comprises a reinforced section at its first and/or second end. Certain embodiments of the present invention also relate to a method for producing the drinking straw according to the invention.

BACKGROUND OF THE INVENTION

Drinking straws are often used for administering substances, such as pharmaceutical formulations, active ingredients, vitamins, foodstuffs and/or nutritional supplements. The substances in particular assume the form of granules, pellets, microtablets or powders. The substance is located in the drinking straw and is sucked, preferably with a liquid, from the drinking straw into the mouth, for example of a patient or consumer. However, the drinking straws according to the prior art exhibit the disadvantage that controllers, which are located inside the drinking straw, are damaged by compression, that the controllers escape from the drinking straw and/or that consumers injure themselves on the edges of the drinking straw.

SUMMARY OF THE INVENTION

One object of certain embodiments of the present invention is to provide a drinking straw which does not exhibit the disadvantages of the prior art.

This object is achieved with a drinking straw comprising: a wall having a first and a second end and a reinforced section at at least one of the first or second end wherein said reinforced section has a double-walled construction in a zone of the at least one first or second end, and wherein the wall is bent at at least one of the first or second end by more than 120°, and wherein a cross-section of an internal side of the wall is star-shaped. Preferred embodiments of the drinking straw according to the invention are provided in the dependent claims appended herewith.

It was utterly surprising to and unexpected for a person skilled in the art that, in the case of the drinking straw according to the invention, the controller is no longer damaged and no longer escapes, the drinking straw is no longer deformed and consumers are no longer injured by grazes or cuts. The drinking straw according to the invention is simple and inexpensive to produce.

For the purposes of the invention, a drinking straw is any drinking straw with which a gas or liquid may be drawn in through a person's mouth.

The drinking straw includes or preferably consists of a thermoplastic or thermosetting plastic.

According to the invention, the drinking straw comprises a reinforced section at its first and/or second end, which reinforced section at least reduces, preferably prevents, deformation of the wall during production, subsequent storage and proper use.

The wall is preferably bent inwards at its first and/or second end by more than 45°, preferably at least 90°, particularly preferably by more than 120°, still more preferably by more than 140°, still further preferably by more than 160° and most preferably by virtually 180°.

The drinking straw is furthermore preferably of double-walled construction in the zone of its first and/or second end, wherein the walls need not lie one against the other. In this embodiment of the present invention, the wall is preferably folded over inwards.

The wall preferably comprises a radius at each of its ends. This embodiment in particular has the advantage that injuries to consumers can be avoided. The radius preferably amounts to more than 1 mm, preferably 1-2 mm.

A double-walled drinking straw having an external round cross-section, furthermore preferably comprises an internal star-shaped cross-section. This star comprises at least three points, but preferably 5 or more points.

A necked-in portion is furthermore preferably formed in the drinking straw.

In a preferred embodiment, the drinking straw according to the invention comprises a control means or controller. On the one hand, said control means prevents the substance packaged in the drinking straw from trickling out of the bottom of the drinking straw. The control means may furthermore serve as an indicator that the substance located in the drinking straw has been completely consumed. Solids made from a gas- and/or liquid-permeable material are suitable as the control means. Examples which may be mentioned are small sponges and/or fiber meshes. The external contour of the control means is preferably of a shape and size which substantially matches the internal contour of the drinking straw.

The bent over ends and/or the necked-in portion preferably serve as a stop or stopping means for the control means, such that the latter cannot be removed from the drinking straw under normal conditions, i.e. the control means does not fall out of the bottom or cannot be sucked or blown out of the drinking straw by the consumer.

The present invention also provides a method for producing the drinking straw according to the invention, in which the reinforced section is formed in the wall of the drinking straw.

The method according to the invention is simple and economic to carry out.

The reinforced section may be formed in the wall of the drinking straw solely by pressure or by pressure in combination with heat. The drinking straw may be heated before and/or during deformation.

At least one end of the drinking straw is preferably bent inwards by at least 45°. The drinking straw is particularly preferably bent inwards by more than 90°, still more preferably by more than 120°, further preferably by more than 140°, still further preferably by more than 160° and most preferably by virtually 180°.

The wall is preferably bent inwards at one of the two ends such that the drinking straw is of double-walled construction at these points, wherein the two walls need not extend parallel to one another. In this embodiment of the method according to the invention, the cross-section of the internal wall is preferably star-shaped.

A necked-in portion is preferably formed in the drinking straw.

Shaping of the wall of the drinking straw preferably proceeds in one or more steps.

The invention is explained below with reference to FIGS. 1 to 5. These explanations are given merely by way of example and do not restrict the general concept of the invention. The explanations apply equally to the drinking straw according to the invention and to the method according to the invention for producing the drinking straw.

DETAILED DESCRIPTION OF THE DRAWINGS

Figure 1:
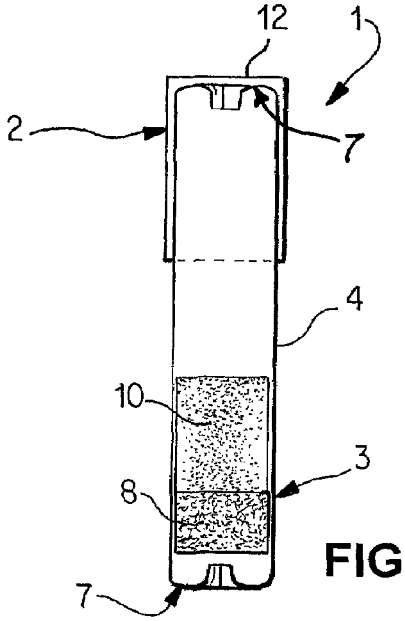
FIG. 1 shows the drinking straw according to the invention.

FIG. 1 shows the drinking straw 1 according to the invention which comprises a wall 4. Inside the drinking straw are located a control means 8 (controller) which, on the one hand, prevents the substance 10, which is located above the control means 8, from trickling out of the bottom of the drinking straw. It is moreover possible to verify with the control means whether the substance 10 has been completely sucked out of the drinking straw. In its upper zone, the drinking straw comprises a cap 12 which, prior to consumption of the substance 10, prevents the latter from escaping from the drinking straw. In its lower zone, the drinking straw comprises the reinforced section 7 according to the invention which is explained below in greater detail. In the drawing, a second bent wall section 7 is shown at the top 2 of the straw.

Figure 2:
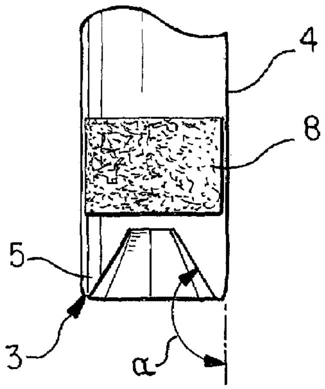
FIG. 2 shows an embodiment of the reinforced section.

FIG. 2 shows an embodiment of the reinforced section according to the invention, in which the lower end of the drinking straw has been bent over inwards by the angle α, which in the present case amounts to at least 160°, such that the drinking straw is double-walled in this zone. This embodiment of the present invention, on the one hand, has the advantage that the drinking straw is comparatively rigid in this zone, such that the drinking straw cannot be deformed or may be deformed only with difficulty in this zone and thus the control means 8, which is located above the reinforced section, is not deformed, so no longer exhibiting its functionality, in particular its interaction with the drinking straw. On the other hand, this type of reinforced section constitutes a very good stop or stopping means for the controller, such that the controller cannot escape from this end of the drinking straw. Thanks to the radius 5, injury to the patient or damage of the packaging, in which the drinking straw is stored, is avoided.

Figure 3:
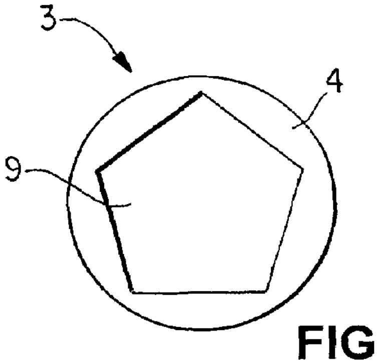
FIG. 3 shows an embodiment of the star-shaped internal cross-section.

FIG. 3 shows an embodiment of the star-shaped cross-section 9 of the internal wall in the double-walled embodiment of the upper or lower end of the drinking straw. Thanks to this embodiment, this end of the drinking straw is particularly stable. The star-shaped internal cross-section is produced during the folding inwards of the wall 4, as shown in FIG. 2. In the present case, the star has five points. The person skilled in the art will recognize that the star should have at least three points, but may also have many more than five points.

Figure 4:
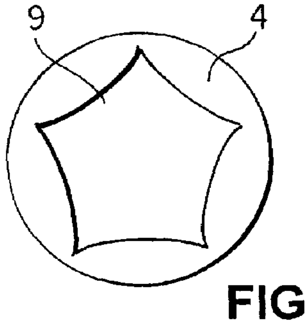
FIG. 4 shows a further embodiment of the star-shaped internal cross-section.

FIG. 4 substantially shows the star-shaped internal diameter according to FIG. 3, wherein in the present case the hollows between the points are more pronounced and arcuate in shape.

Figure 5:
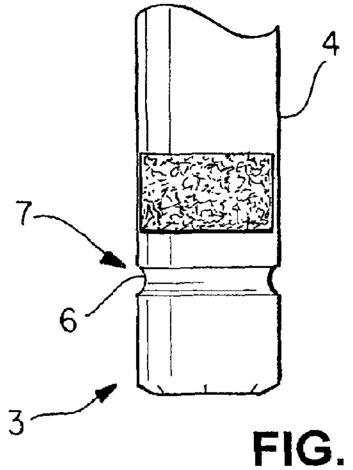
FIG. 5 shows a further embodiment of the reinforced section of the drinking straw.

FIG. 5 shows another embodiment of the reinforced section according to the invention, which in the present case is provided as a necked-in portion 6. The necked-in portion is formed in the drinking straw. The necked-in portion 6 simultaneously acts as a stopping means for the controller 8. Escape from the drinking straw is particularly reliably avoided by this embodiment of the drinking straw according to the invention because the necked-in portion 6 and the bent over portion of the drinking straw provide redundant means at the lower end for stopping the controller.

Figure 6:
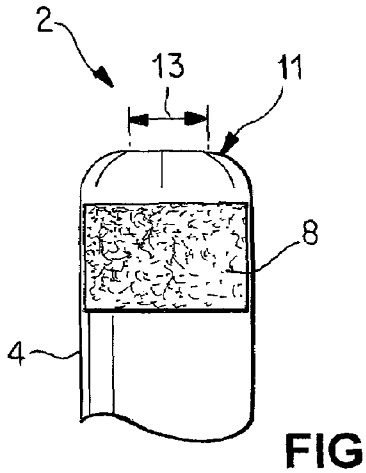
FIG. 6 shows the upper end of the drinking straw.

FIG. 6 shows the upper end of the drinking straw, from which the substance 10 is sucked. In the present case, as shown by the arrow 11, this end is merely drawn inwards, such that the controller 8 cannot escape from the drinking straw and no sharp edges are present at this point which could injure the user's mouth or damage the packaging. At the end which comes into contact with the mouth, it is important for the internal cross-section to be within comparatively narrow tolerances in order to allow reliable exit of the particles. This cross-section may also provide a form-fitting connection for the cap.

LIST OF REFERENCE NUMERALS

1 drinking straw
2 upper end
3 lower end
4 wall
5 radius
6 necked-in portion
7 reinforced section
8 controller
9 star-shaped internal diameter
10 substance
11 single crimp
12 cap
13 diameter The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereto.

What is claimed is:

1. A drinking straw comprising a wall having a first and a second end and a reinforced section at least one of the first or second end, wherein said reinforced section has a double-walled construction in a zone of the at least one first or second end, the wall is bent at least one of the first or second end by more than 120°, a cross-section of an internal side of the bent wall is star-shaped, the bent wall has a radius of greater than 1 mm, the drinking straw comprises a necked-in portion, and the drinking straw further comprises a liquid-permeable controller disposed in the straw such that the bent wall and the necked in portion act as stops for the controller to retain the controller in the straw and the controller cannot be sucked or blown out of the straw.

2. A drinking straw according to claim 1, wherein the wall is bent at least one of the first or second end by more than 140°.

3. A drinking straw according to claim 1, wherein the wall is bent at least one of the first or second end by more than 160°.

4. A drinking straw according to claim 1, wherein the wall is bent at least one of the first or second end by almost 180°.

5. A drinking straw according to claim 1, wherein the radius is from 1-2 mm.

6. A drinking straw according to claim 1, wherein the straw is made of plastic.

* * * * *